US012718623B2

(12) United States Patent
Yadav et al.

(10) Patent No.: US 12,718,623 B2
(45) Date of Patent: Aug. 25, 2026

(54) DYNAMIC SIGNATURE IDENTIFICATION FROM HANDWRITTEN ELEMENTS

(71) Applicant: Oracle International Corporation, Redwood Shores, CA (US)

(72) Inventors: Sourabh Singh Yadav, Bengaluru (IN); Sandeep Jana, Bengaluru (IN); Vishal Vijay, New Delhi (IN); Kulbhushan Pachauri, Bengalore (IN)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 18/788,935

(22) Filed: Jul. 30, 2024

(65) Prior Publication Data

US 2026/0038306 A1 Feb. 5, 2026

(51) Int. Cl.

*G06V 40/30* (2022.01)
*G06T 7/70* (2017.01)
*G06V 10/40* (2022.01)
*G06V 30/412* (2022.01)

(52) U.S. Cl.

CPC ................ *G06V 40/33* (2022.01); *G06T 7/70* (2017.01); *G06V 10/40* (2022.01); *G06V 30/412* (2022.01)

(58) Field of Classification Search

CPC ...... G06V 40/33; G06V 10/40; G06V 30/412; G06V 10/82; G06T 7/70

See application file for complete search history.

(56) References Cited

U.S. PATENT DOCUMENTS

2022/0156756 A1* 5/2022 Eapen .................. G06Q 10/103

OTHER PUBLICATIONS

Ahmed et al., “Extraction of Signatures from Document Images for Real World Applications”, Journal of the American Society of Questioned Document Examiners, vol. 18, Issue 2, pp. 67-78 (Year: 2015).*

Crawford et al., “A clustering method for graphical handwriting components and statistical writership analysis”, Stat Anal Data Min: The ASA Data Sci Journal, p. 14:41-60 (Year: 2021).*

De Lima et al, “Signature line detection in scanned documents”, 2016 IEEE International Conference on Image Processing (ICIP), Phoenix, AZ, USA, 2016, pp. 3254-3258 (Year: 2016).*

Majumdar et al., Recognizing Handwriting Styles in a Historical Scanned Document Using Unsupervised Fuzzy Clustering, arXiv: 2210.16780v2 (Year: 2023).*

(Continued)

*Primary Examiner* — Vu Le
*Assistant Examiner* — Rachel Anne Ometz
(74) *Attorney, Agent, or Firm* — Kilpatrick Townsend & Stockton LLP

(57) ABSTRACT

A method can include identifying handwritten elements from a document image. The method can include generating embeddings for the handwritten elements, and the embeddings may represent features extracted from the handwritten elements. The method can include clustering the embeddings into clusters. The method can include processing the document image to identify areas within the document image designated for placement of a signature. The method can include, based upon locations of the areas within the document image, tagging each cluster as a signature cluster or as a non-signature cluster. The method can include outputting indications that a handwritten element is a signature element or is a non-signature element.

20 Claims, 11 Drawing Sheets

(56) References Cited

OTHER PUBLICATIONS

Mandal et al., "Bag-of-Visual-Words for Signature-Based Multi-Script Document Retrieval", arXiv:1807.06772 (Year: 2018).*
"DaFont—Download Fonts", Available online at: https://www.dafont.com, Accessed from Internet on Apr. 26, 2024, 2 pages.
"Document AI Overview", Available online at: https://cloud.google.com/document-ai/docs/overview, Apr. 24, 2024, 5 pages.
"Document Intelligence Custom Models", Available online at: https://learn.microsoft.com/en-us/azure/ai-services/document-intelligence/concept-custom?view=doc-intel-3.1.0#try-signature-detection, Mar. 11, 2024, 9 pages.
"Featured Fonts", Available online at: https://fontlibrary.org, Accessed from Internet on Apr. 26, 2024, 3 pages.
"Google Fonts", Available online at: https://fonts.google.com, Accessed from Internet on Apr. 26, 2024, 200 pages.
"MyFonts", Available online at: https://www.myfonts.com, Accessed from Internet on Apr. 26, 2024, 2 pages.
"New & Fresh Fonts", Available online at: https://www.1001fonts.com, Accessed from Internet on Apr. 26, 2024, 3 pages.
"Ultralytics", Available online at: https://github.com/ultralytics/yolov5, Accessed from Internet on Apr. 26, 2024, 6 pages.
Archibald et al., "TRACE: A Differentiable Approach to Line-level Stroke Recovery for Offline Handwritten Text", Computer Vision and Pattern Recognition, Available online at: [2105.11559] TRACE: A Differentiable Approach to Line-level Stroke Recovery for Offline Handwritten Text (arxiv.org), May 24, 2021, pp. 1-16.
Dwibedi et al., "With a Little Help From My Friends: Nearest-Neighbor Contrastive Learning of Visual Representations", In Proceedings of the IEEE/CVF International Conference on Computer Vision, Available online at: https://arxiv.org/pdf/2104.14548.pdf, Oct. 7, 2021, 17 pages.
Li et al., "DiT: Self-supervised Pre-training for Document Image Transformer", Available online at: https://arxiv.org/abs/2203.02378, Jul. 19, 2022, 10 pages.
Li et al., "Prototypical Contrastive Learning of Unsupervised Representations", Available online at: https://arxiv.org/pdf/2005.04966.pdf, Mar. 30, 2021, pp. 1-16.
Yang et al., "Lightweight Feature Fusion Network for Single Image Super-Resolution", Available online at: https://arxiv.org/pdf/1902.05694, Apr. 13, 2019, pp. 1-5.

* cited by examiner

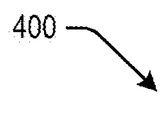
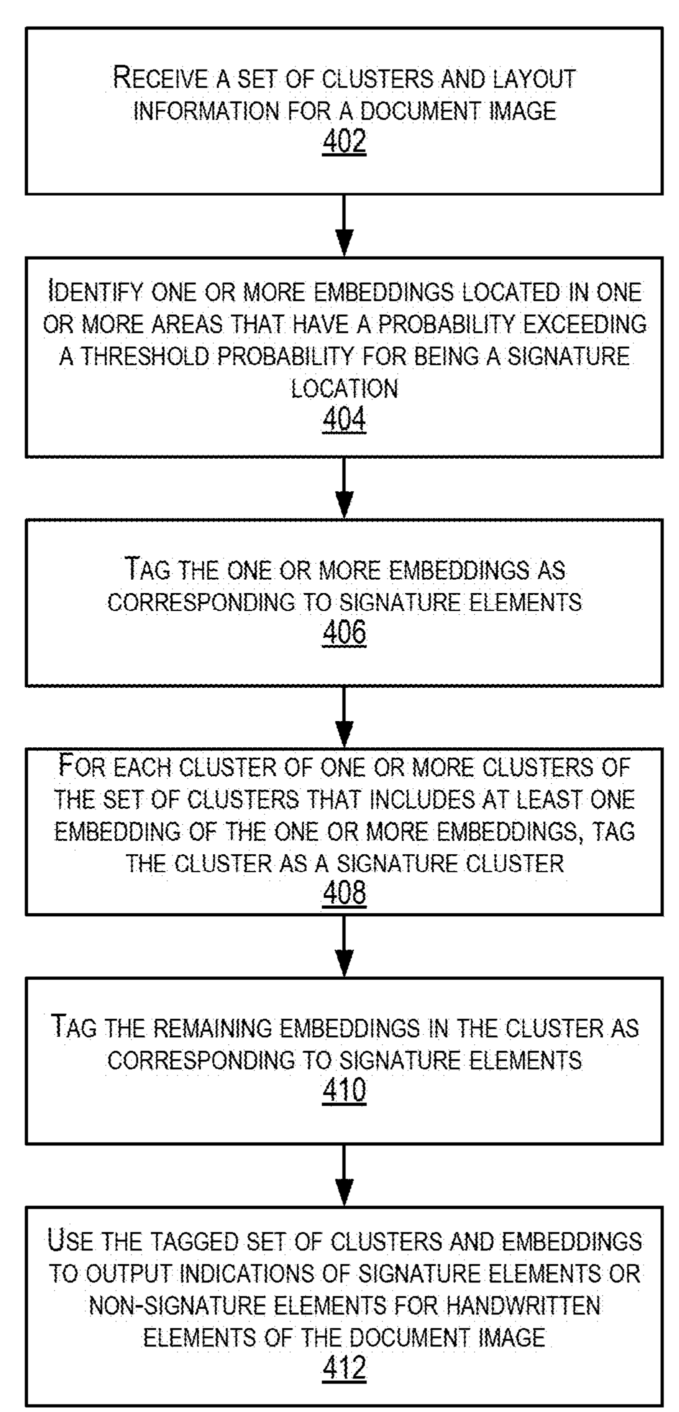
*FIG. 4*

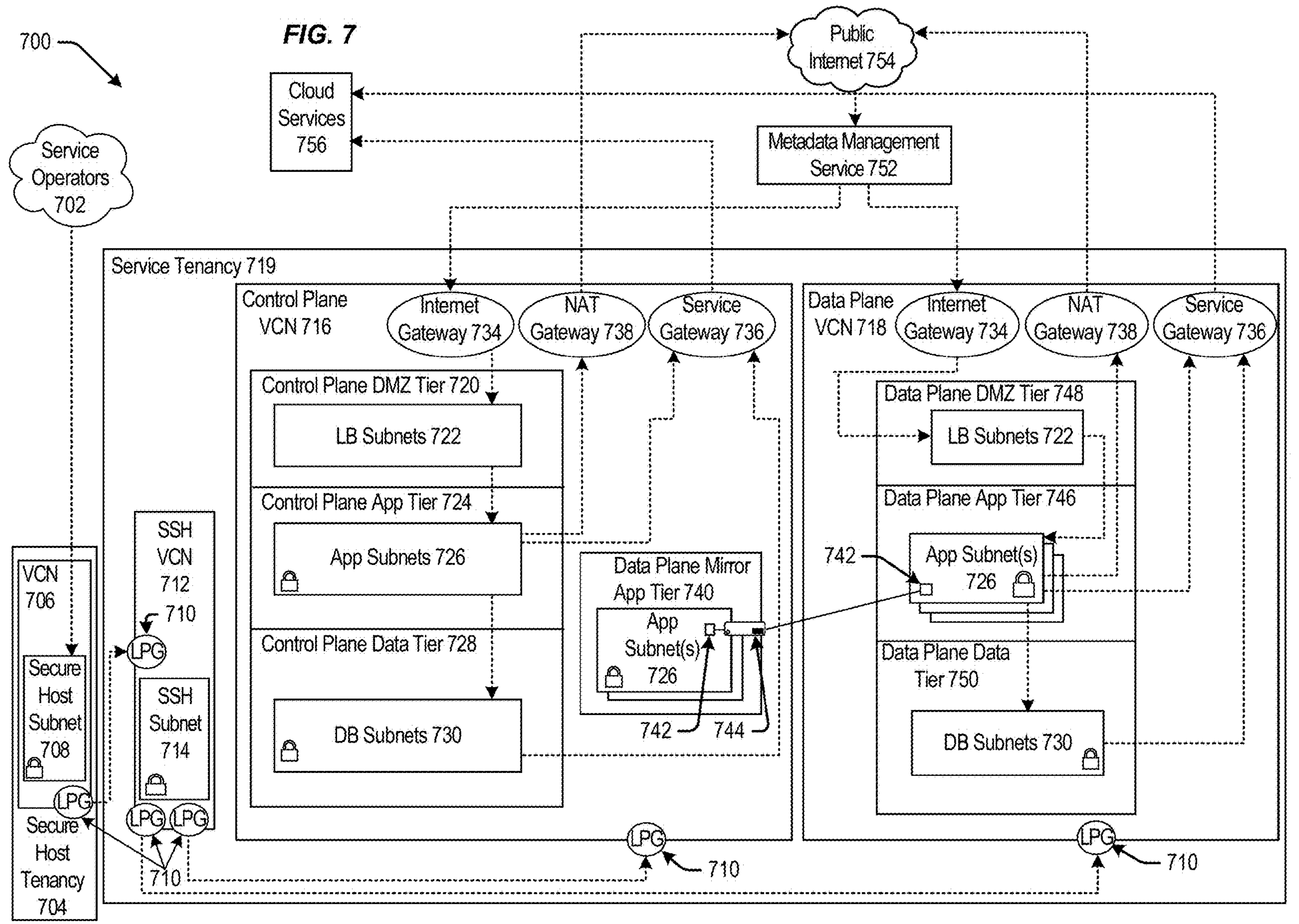
700
FIG. 7
Service Operators 702
Cloud Services 756
Public Internet 754
Metadata Management Service 752
Service Tenancy 719
Control Plane VCN 716
Internet Gateway 734
NAT Gateway 738
Service Gateway 736
Control Plane DMZ Tier 720
LB Subnets 722
Control Plane App Tier 724
App Subnets 726
Control Plane Data Tier 728
DB Subnets 730
Data Plane Mirror App Tier 740
App Subnet(s) 726
742
744
Data Plane VCN 718
Internet Gateway 734
NAT Gateway 738
Service Gateway 736
Data Plane DMZ Tier 748
LB Subnets 722
Data Plane App Tier 746
742
App Subnet(s) 726
Data Plane Data Tier 750
DB Subnets 730
VCN 706
Secure Host Subnet 708
Secure Host Tenancy 704
SSH VCN 712
710
LPG
SSH Subnet 714
LPG
LPG
LPG
710
LPG
710
LPG
710

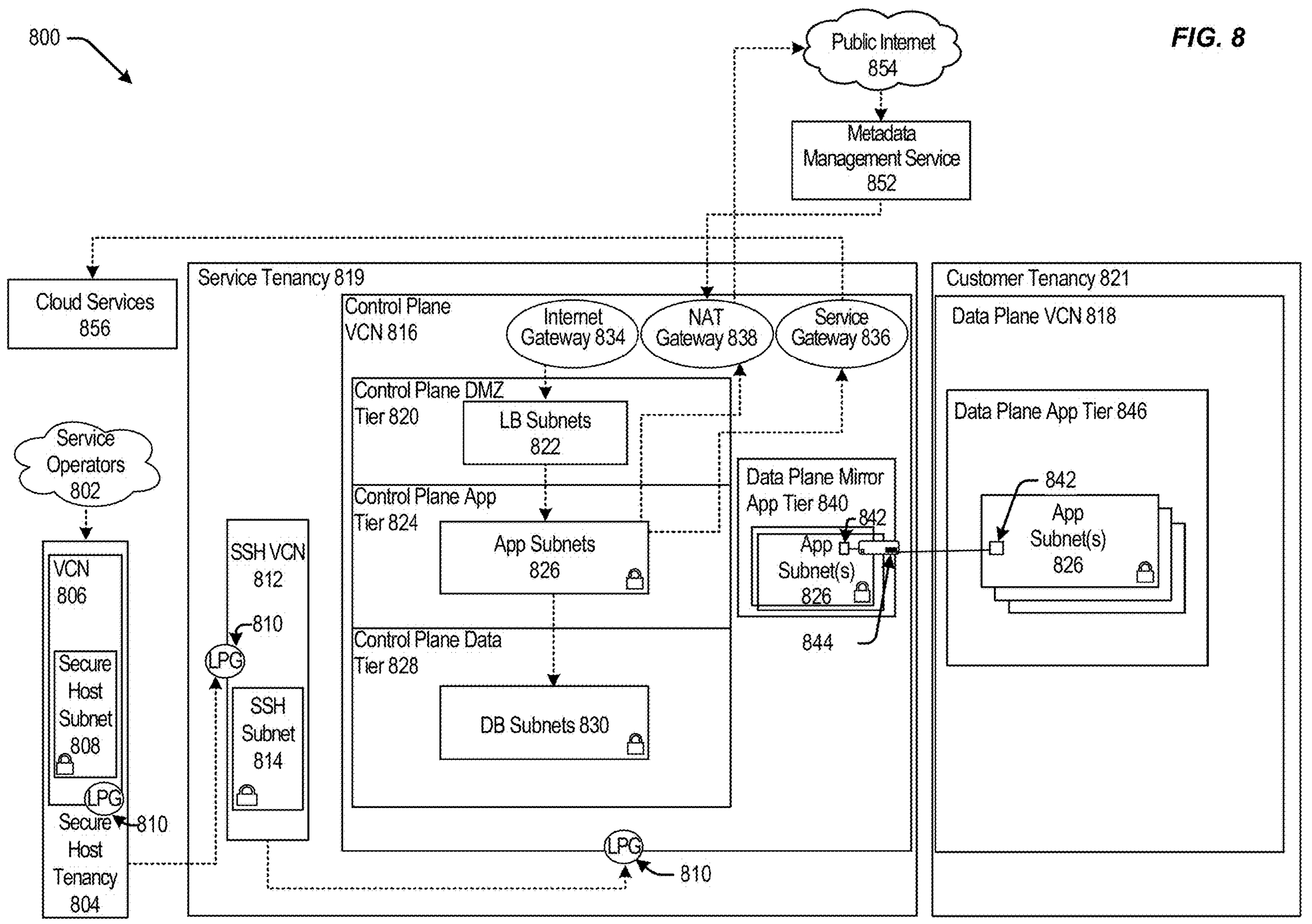
800
Public Internet 854
FIG. 8
Metadata Management Service 852
Cloud Services 856
Service Tenancy 819
Control Plane VCN 816
Internet Gateway 834
NAT Gateway 838
Service Gateway 836
Customer Tenancy 821
Data Plane VCN 818
Control Plane DMZ Tier 820
LB Subnets 822
Data Plane App Tier 846
Service Operators 802
Control Plane App Tier 824
App Subnets 826
Data Plane Mirror App Tier 840
842
App Subnet(s) 826
842
App Subnet(s) 826
VCN 806
SSH VCN 812
810
LPG
Control Plane Data Tier 828
844
Secure Host Subnet 808
SSH Subnet 814
DB Subnets 830
LPG
Secure Host Tenancy 804
810
LPG
810

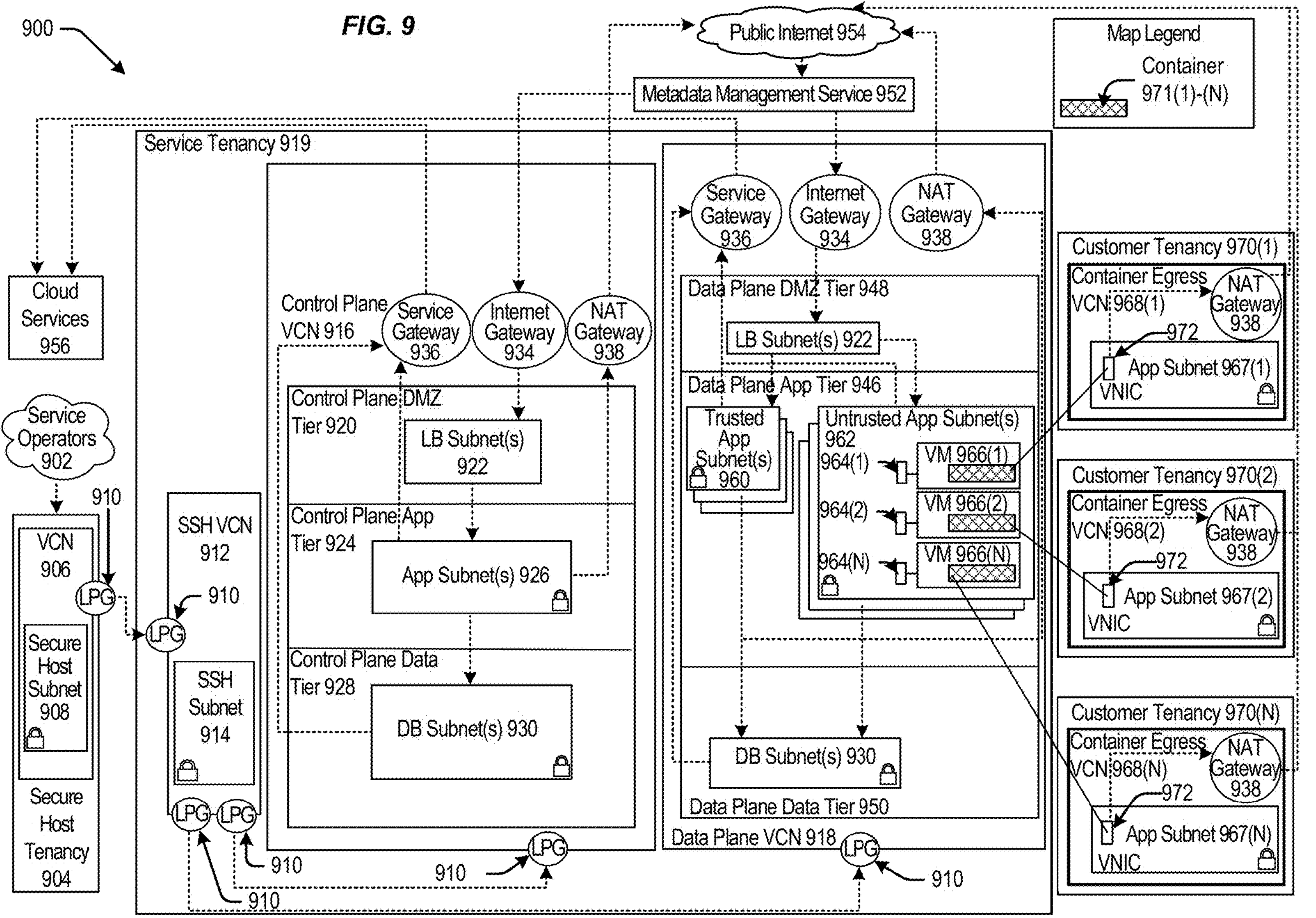
900
FIG. 9
Public Internet 954
Metadata Management Service 952
Map Legend
Container 971(1)-(N)
Service Tenancy 919
Cloud Services 956
Service Operators 902
VCN 906
Secure Host Subnet 908
Secure Host Tenancy 904
LPG
910
SSH VCN 912
SSH Subnet 914
Control Plane VCN 916
Service Gateway 936
Internet Gateway 934
NAT Gateway 938
Control Plane DMZ Tier 920
LB Subnet(s) 922
Control Plane App Tier 924
App Subnet(s) 926
Control Plane Data Tier 928
DB Subnet(s) 930
Data Plane DMZ Tier 948
Data Plane App Tier 946
Trusted App Subnet(s) 960
Untrusted App Subnet(s) 962
964(1)
964(2)
964(N)
VM 966(1)
VM 966(2)
VM 966(N)
Data Plane Data Tier 950
Data Plane VCN 918
Customer Tenancy 970(1)
Container Egress VCN 968(1)
972
App Subnet 967(1)
VNIC
Customer Tenancy 970(2)
Container Egress VCN 968(2)
App Subnet 967(2)
Customer Tenancy 970(N)
Container Egress VCN 968(N)
App Subnet 967(N)

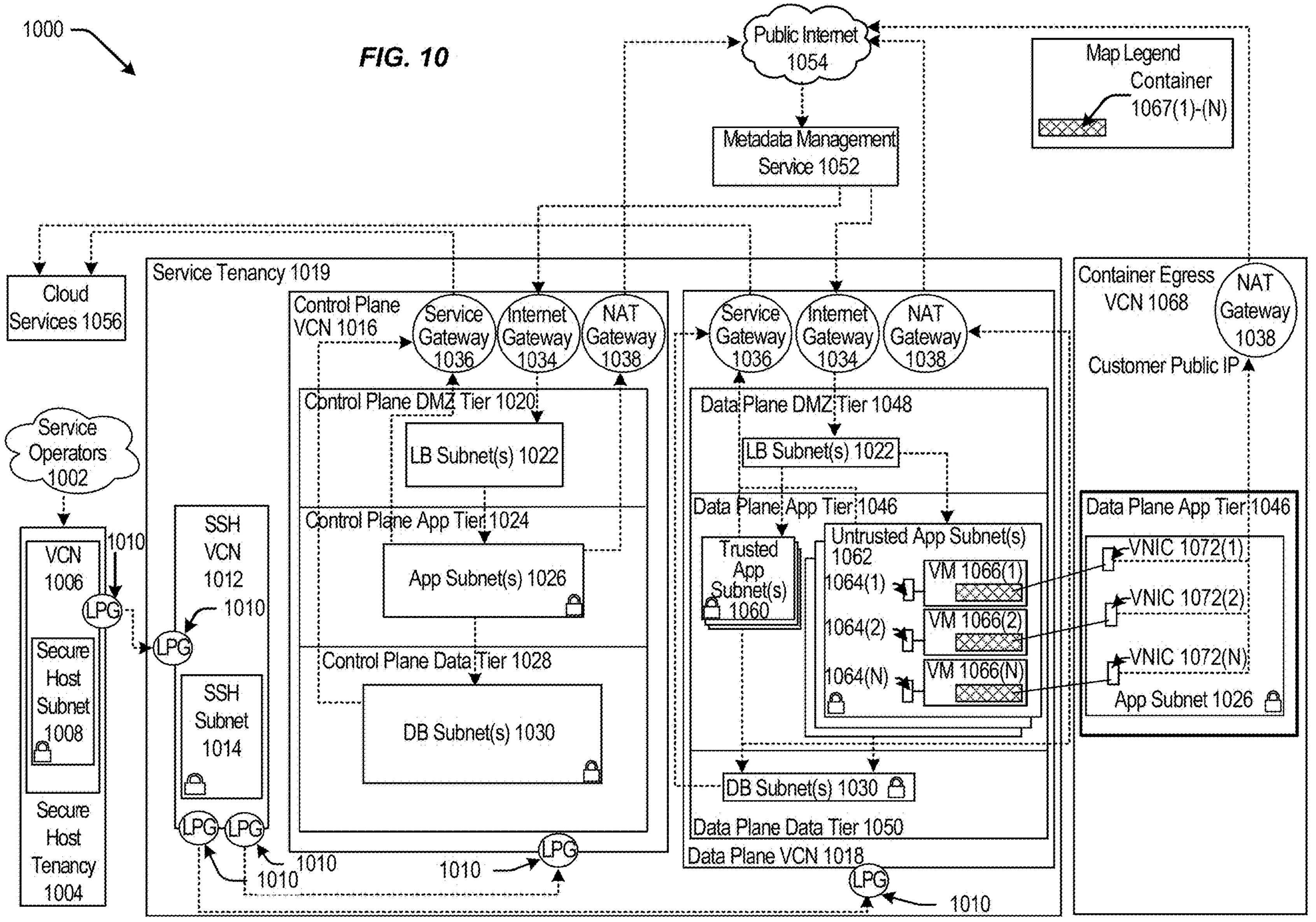

1000
FIG. 10
Public Internet 1054
Map Legend
Container 1067(1)-(N)
Metadata Management Service 1052
Cloud Services 1056
Service Tenancy 1019
Control Plane VCN 1016
Service Gateway 1036
Internet Gateway 1034
NAT Gateway 1038
Control Plane DMZ Tier 1020
LB Subnet(s) 1022
Control Plane App Tier 1024
App Subnet(s) 1026
Control Plane Data Tier 1028
DB Subnet(s) 1030
Service Gateway 1036
Internet Gateway 1034
NAT Gateway 1038
Data Plane DMZ Tier 1048
LB Subnet(s) 1022
Data Plane App Tier 1046
Trusted App Subnet(s) 1060
Untrusted App Subnet(s) 1062
1064(1)
1064(2)
1064(N)
VM 1066(1)
VM 1066(2)
VM 1066(N)
DB Subnet(s) 1030
Data Plane Data Tier 1050
Data Plane VCN 1018
Container Egress VCN 1068
NAT Gateway 1038
Customer Public IP
Data Plane App Tier 1046
VNIC 1072(1)
VNIC 1072(2)
VNIC 1072(N)
App Subnet 1026
Service Operators 1002
VCN 1006
LPG
1010
Secure Host Subnet 1008
Secure Host Tenancy 1004
SSH VCN 1012
SSH Subnet 1014

DYNAMIC SIGNATURE IDENTIFICATION FROM HANDWRITTEN ELEMENTS

FIELD

The present disclosure relates to novel techniques for identifying signatures on a document image that includes handwritten elements such as handwritten text. In certain implementations, the layout of the document image is used in combination with embeddings of handwritten elements to identify signatures anywhere on the document image.

BACKGROUND

Signature detection is an important component of document understanding and can play a crucial role in analyzing various documents such as lease agreements, insurance forms, passports, driver's licenses, invoices, legal agreements, and the like. Accurate and efficient handwritten signature detection can be useful for various industries such as healthcare, law, finance, and the like. Documents may have a wide variety of languages and may pose significant challenges to detect signatures when the document includes handwritten words and other stray marks. Examples can include doctor's prescriptions having prescription details and signatures, agreements with multiple signatures, and documents annotated with unintended or stray marks.

Detecting handwritten signatures in documents is a challenging task, especially when these documents include handwritten words and stray marks. The inherent similarity between handwritten words and signatures makes it difficult to distinguish effectively. For example, detection of handwritten text or stray marks as potential signatures may be possible. Accommodating handwritten signatures across various languages further complicates the detection process. For example, the handwritten script in one language may closely resemble a signature in another language. This multi-lingual aspect introduces an additional layer of complexity to the signature detection challenge.

BRIEF SUMMARY

The present disclosure relates generally to dynamic signature detection from handwritten elements. One or more trained models, such as a trained feature extraction model, can be used to detect handwritten elements included in a document image, extract features from the detected handwritten elements, embed the extracted features, cluster the embeddings into clusters, analyze a layout of the document image, and tag the clusters as signature clusters and/or non-signature clusters. Based on the tagged clusters, signatures that may not appear in areas of the document image intended for signatures can be detected and/or otherwise indicated as a signature.

Various embodiments are described herein to illustrate various features. These embodiments include various methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain embodiments, a method can be used to dynamically identify a signature among handwritten text of a document image. The method can include identifying a set of handwritten elements from the document image. The method can include generating, using a trained model, a set of embeddings for the set of handwritten elements by generating an embedding for each handwritten element in the set of handwritten elements. An embedding generated for a handwritten element can represent one or more features extracted from the handwritten element. The method can include clustering the set of embeddings to create a set of clusters in which each cluster included in the set of clusters can include at least one embedding from the set of embeddings. The method can include processing the document image to identify one or more areas within the document image designated for placement of a signature. The method can include, based upon locations of the one or more areas within the document image, tagging each cluster included in the set of clusters as a signature cluster or as a non-signature cluster. The method can include, for each cluster included in the set of clusters that is tagged as a signature cluster, and for each embedding included in the cluster, outputting an indication that a handwritten element of the set of handwritten elements corresponding to the embedding is a signature element. The method can include, for each cluster included in the set of clusters that is tagged as a non-signature cluster, and for each embedding included in the cluster, outputting an indication that a handwritten element of the set of handwritten elements corresponding to the embedding is a non-signature element.

In certain examples, the trained model can be or include a trained feature extraction model that is configured to extract the one or more features from each handwritten element included in the set of handwritten elements. Additionally or alternatively, the feature extraction model can be trained using a contrastive loss technique.

In certain examples, using the contrastive loss technique can include (i) receiving a first handwritten element and a second handwritten element in which the first handwritten element and the second handwritten element are included in a synthetic training dataset, (ii) extracting, using a feature extraction model, one or more first features from the first handwritten element and one or more second features from the second handwritten element, (iii) generating (a) a first embedding based on the one or more first features and (ii) a second embedding based on the one or more second features, (iv) determining a contrastive loss between the first embedding and the second embedding, and (v) determining, based at least in part on the contrastive loss between the first embedding and the second embedding, whether to update one or more weights of the feature extraction model.

In certain examples, the computer-implemented method may additionally include, in accordance with determining that the one or more weights are to be updated, updating the one or more weights of the feature extraction model based at least in part on the contrastive loss.

In certain examples, tagging each cluster included in the set of clusters as a signature cluster or as a non-signature cluster can include, for each handwritten element included in the set of handwritten elements (i) identifying, based on a bounding box associated with the handwritten element, a location of the handwritten element within the document image, (ii) determining whether the handwritten element is within an area designated for a signature by comparing the location to the one or more areas, and (iii) in accordance with determining that the handwritten element is within the area, tagging a particular cluster that includes the handwritten element as a signature cluster.

In certain examples, the particular cluster can include a second handwritten element, and the computer-implemented method may additionally include (i) determining, based on a second bounding box associated with the second handwritten element, that the second handwritten element is not located within the area designated for a signature, and (ii) outputting, based on the second handwritten element being included in the particular cluster, an indication that the second handwritten element is a signature element.

In certain examples, processing the document image to identify the one or more areas within the document image designated for placement of a signature can additionally include using a document image transformer module to perform the processing. The document image transformer module can be pre-trained on synthetic data and contextual data relating to the document image.

The foregoing, together with other features and embodiments will become more apparent upon referring to the following specification, claims, and accompanying drawings.

BRIEF DESCRIPTION OF DRAWINGS

To easily identify the discussion of any particular element or act, the most significant digit or digits in a reference number refer to the figure number in which that element is first introduced.

FIG. 4 is a flowchart of a process for tagging clusters as signature clusters or as non-signature clusters according to at least one embodiment.

FIG. 7 is a block diagram illustrating one pattern for implementing a cloud infrastructure as a service system according to at least one embodiment.

FIG. 8 is a block diagram illustrating another pattern for implementing a cloud infrastructure as a service system according to at least one embodiment.

FIG. 9 is a block diagram illustrating another pattern for implementing a cloud infrastructure as a service system according to at least one embodiment.

FIG. 10 is a block diagram illustrating another pattern for implementing a cloud infrastructure as a service system according to at least one embodiment.

DETAILED DESCRIPTION

Figure 1:
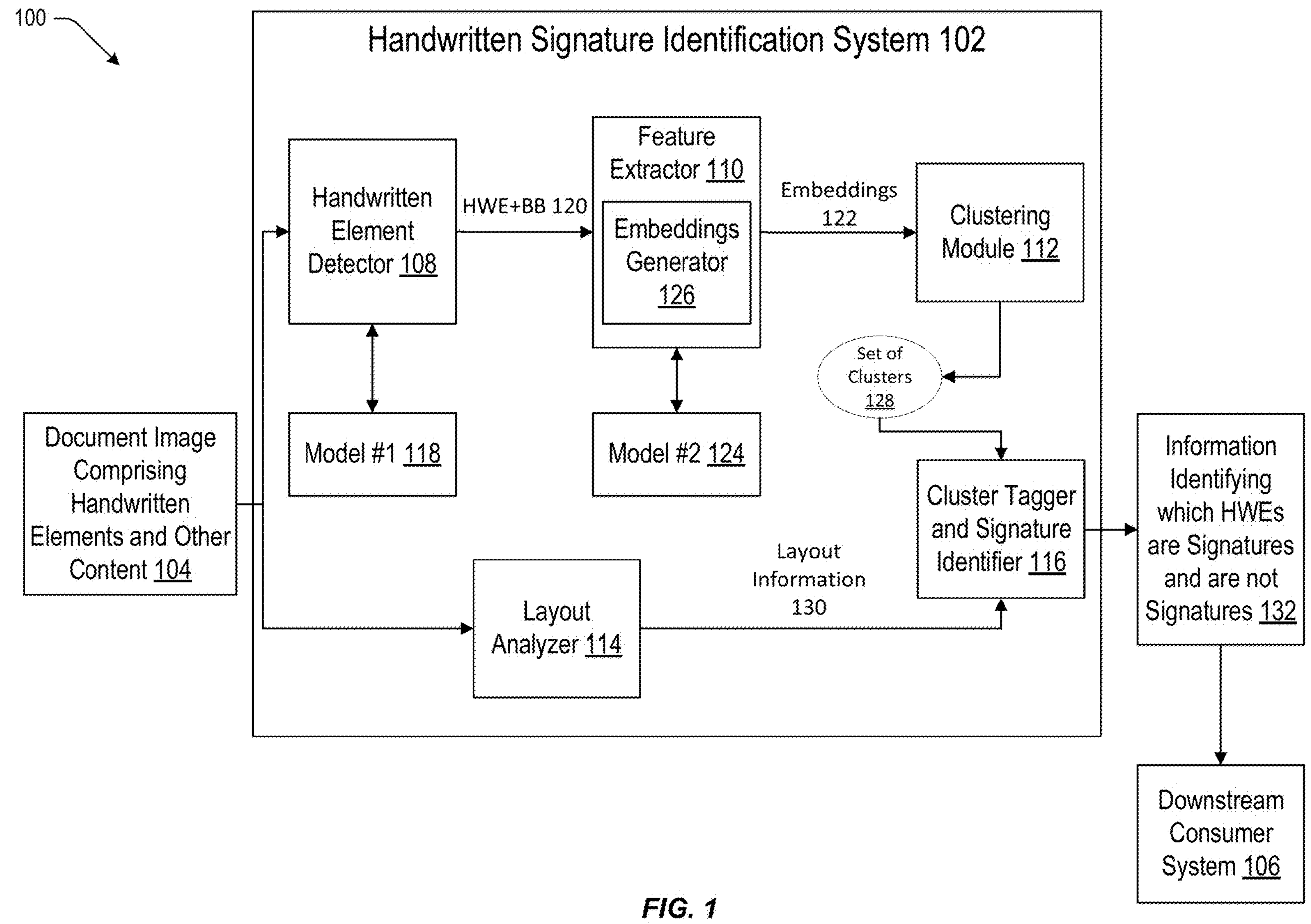
FIG. 1 is a diagram of a signature identification system according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to dynamically detecting signatures on a document image based on handwritten elements and on a layout or structure of the document image. In some embodiments, the document image may include image data taken based on a real-world document. The real-world document may be or include a paper-based document that may be used to initiate or facilitate an interaction between separate entities. In a particular example, the real-world document may include an application to request an account be opened for a user of services with a provider of the services, and the real-world document can be scanned or otherwise digitized to generate the document image. The real-world document may include one or more handwritten elements, which can include handwritten signatures, handwritten stray marks, handwritten text that is not a signature, and the like. The document image may include the one or more handwritten elements, which may be digitized along with the rest of the real-world document. The document image may be analyzed by a dynamic signature identification system, and the dynamic signature identification system may identify the one or more handwritten elements, may generate embeddings of the one or more handwritten elements, may generate one or more clusters based on the embeddings, may analyze a layout or structure of the document image, and the like. Based on one or more operations performed by the dynamic signature identification system, and regardless of location with respect to the document image, one or more signatures can be identified from among the one or more handwritten elements included in the document image.

Other signature detection methods treat signature detection as an object-detection problem by training models to identify handwritten signatures. However, these approaches encounter multiple limitations:

- Real world data requirements: the other signature detection methods involve an extensive dataset representing diverse signatures, which involves considerable time and human effort for manual collection.
- Low availability of personally identifiable information (PII) documents: since signatures are PII information, the availability of diverse and license-friendly datasets is limited. Additionally, securing and storing such datasets is costly both in terms of time and money.
- Language variability: signatures exhibit significant variations based on the language of the document. For example, a handwritten word in one language may appear as signature in other language, making it impractical to collect signatures from many different languages.
- Intra-class variability and Inter-class similarity: signatures from the same individual can have variations while using different writing styles. Stray marks or handwriting of an individual may exhibit visual similarity with signature.

Synthetic signature generation, using fonts resembling human handwriting, is another approach to signature detection. However, techniques that use synthetically generated data face various limitations. For example, techniques involving synthetic signature generation lack in the diversity of human-resembling signature fonts. For example, there are approximately 300 fonts resembling human handwriting in the English language, but these 300 fonts do not resemble even a fraction of the possible signatures for humans. Additionally or alternatively, the techniques using synthetic signature generation lack in identifying the subtle differences between handwritten words and signatures, which can result in significant false detections. Additionally or alternatively, various document-understanding solutions rely on optical character recognition and fail to detect handwritten signatures.

A signature identification system can be used to address the above-described, and other, technical problems relating to signature identification based on handwritten elements. The signature identification system distinguishes handwritten words and stray marks from signatures among handwritten elements on a document image. In some embodiments, the signature identification system can include a handwritten element detector, a feature extractor, a clustering module, a layout analyzer, and a tagging and identification module. By using a combination of the foregoing, the signature identification system can more accurately and more precisely identify signatures from among the handwritten elements include in the document image.

The handwritten element detector can use an object detection model trained on synthetically generated signature data to identify handwritten elements, which can include signatures, handwritten words, stray marks, etc., within the document image. The object detection model can identify potential signatures, which may include false positives from stray marks and handwritten words. The object detection model can output a bounding box with each handwritten element of the handwritten elements, and the bounding boxes, with the handwritten elements included therein, can be further analyzed by the feature extractor by extracting deep features and strokes. The feature extractor may be or include a deep feature extraction model that can be trained using contrastive loss. Training using contrastive loss can facilitate teaching the deep feature extraction model discriminative features between different handwritten elements of the document image. The derived features, which can be converted into embeddings, contribute to clustering common patterns observed in signatures and handwritten words. The clustering module can generate a set of clusters based on the embeddings. The layout analyzer can incorporate historical document layouts and can generate probability heatmaps for potential signature locations. The tagging and identification module can use the clusters and the output from the layout analyzer to suppress false positives, such as stray marks, and to detect real signatures.

The signature identification system can solve the technical problems relating to signature identification in a document image. For example, the signature identification system may be less dependent, or not dependent, on real signatures. The signature identification system can use synthetic data for extracting candidate signatures, which can minimize, such as to zero, the number of real-world signatures used for training the signature identification system or any model included therein. Additionally or alternatively, the signature identification system may be language agnostic. The signature identification system can use unsupervised training techniques, such as via feature extraction, clustering, etc., which may mitigate or eliminate biases relating to any language. Additionally or alternatively, the signature identification system may be layout independent. The signature identification system may accurately and/or precisely identify signatures on a wide variety of documents that have differing layouts or structures. The signature identification system, and the methods associated therewith, can suppress candidate false positives, such as false positive signatures, to accurately and/or precisely identify signatures among handwritten elements included in a document image.

Figure 11:
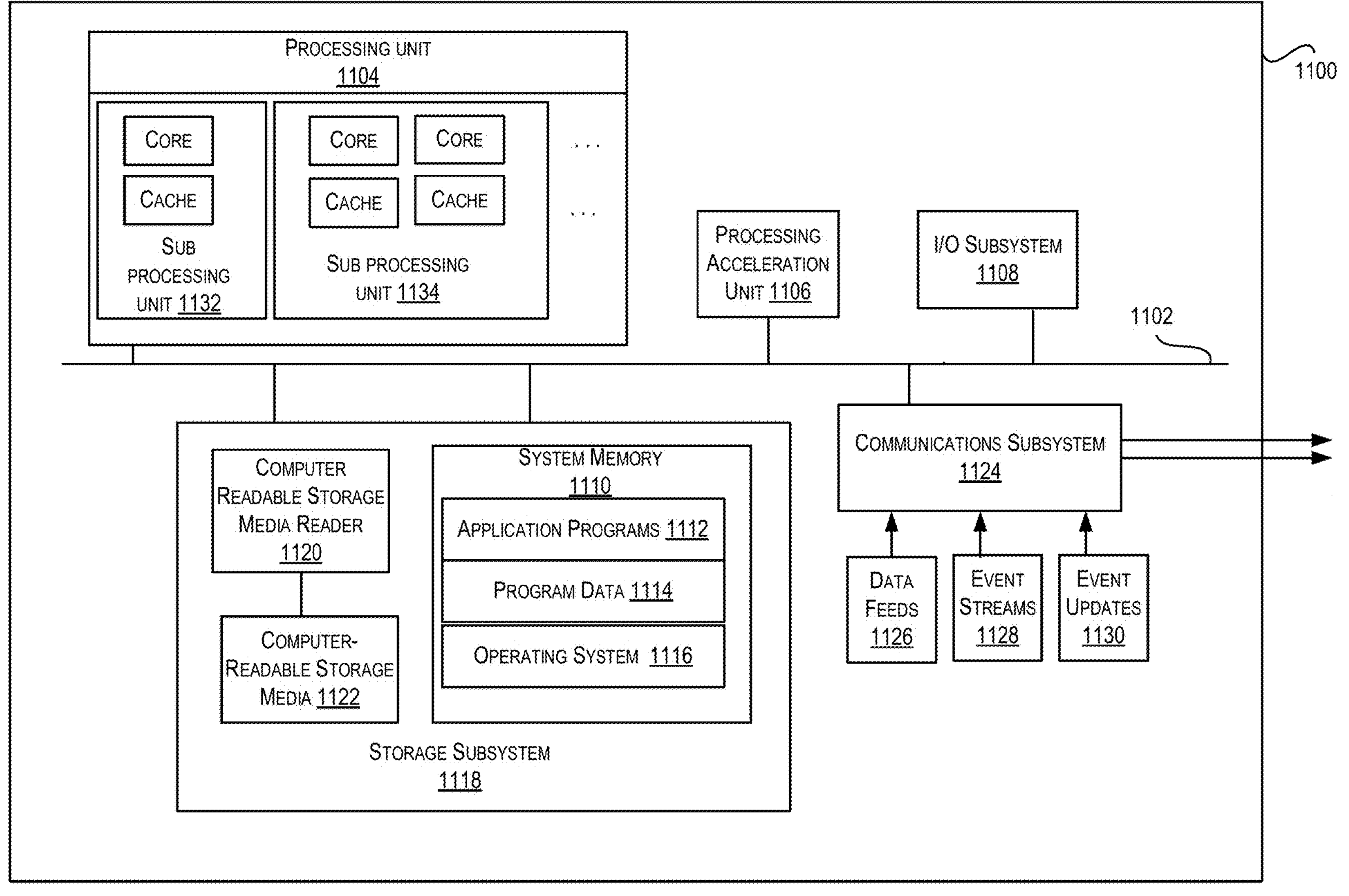
FIG. 11 is a block diagram illustrating an example computer system according to at least one embodiment.

FIGS. 1-6 describe examples and embodiments related to a novel signature identification system and methods associated with the novel signature identification system for dynamically identifying signatures from handwritten elements in a document image. FIGS. 7-10 depict examples of architectures for implementing cloud infrastructures for providing one or more cloud services, where the infrastructures may incorporate teachings described herein. FIG. 11 depicts a block diagram illustrating an example computer system or device, according to at least one embodiment.

Novel Architectures and Methods for Dynamic Signature Identification

FIG. 1 is a diagram of a computing environment 100 that includes a signature identification system 102 according to at least one embodiment. As illustrated in FIG. 1, the computing environment 100 includes the signature identification system 102, a document image 104, and a downstream consumer system 106. The downstream consumer system 106 may include one or more systems or entities. In some embodiments, the computing environment 100 can include additional, alternative, or fewer components, services, or the like compared to those illustrated in FIG. 1.

The document image 104 may be or include image data generated based on a real-world document such as a paper-based document. In other examples, the document image 104 may be or include a digital document that includes one or more handwritten elements such as a signature, a stray mark, a handwritten word, etc. A handwritten element may include an element, such as a signature, a word, a mark, etc., that may be generated by input via a human body. The input may be generated by writing with a pen or pencil, may be generated by using a stylus or other input device on a touchscreen of a computing device, and the like. Additionally or alternatively, the document image 104 may include other content separate from the handwritten elements. For example, the document image 104 may include structural features, such as signature lines, headings, tables, etc., additional information, such as personal information, interaction information, etc., and the like. The document image 104 may be a digitized version of a paper-based document, may be a digitally created document that can receive a handwritten signature and other handwritten elements, or the like. The document image 104 may be provided to the signature identification system 102 as an image file or other suitable image-based data.

The signature identification system 102 may receive the document image 104 and may perform various processing techniques on the document image 104 using various modules, services, models, and the like. As illustrated in FIG. 1, the signature identification system 102 can include a handwritten element detector 108, a feature extractor 110, a clustering module 112, a layout analyzer 114, and a cluster tagger and signature identifier 116, though the signature identification system 102 may include additional, alternative, or fewer components for providing functionality to the signature identification system 102. The document image 104 may be provided to the handwritten element detector 108, and the handwritten element detector 108 can detect a set of handwritten elements. Each handwritten element of the set of handwritten elements may include a signature, a stray mark, a handwritten word, or the like. In some embodiments, the handwritten element detector 108 may use a first model 118 to identify the set of handwritten elements. The first model 118 may be or include an object detection model that can be trained on synthetic data. The first model 118 can detect handwritten words, signatures, and possible stray marks in the document image 104. In some embodiments, the first model 118 may assign probability scores to each handwritten element of the set of handwritten elements in one-to-one correspondence. The first model 118 can be trained with synthetic documents that include handwriting resembling font-based signatures in a variety of languages and layouts. An output of the handwritten element detector 108 may include a combination of handwritten elements and bounding boxes (HWE+BB 120). The HWE+BB 120 may include the set of handwritten elements and a corresponding set of bounding boxes in which each bounding box of the set of bounding boxes corresponds to a different handwritten element of the set of handwritten elements.

The HWE+BB 120 may be provided to the feature extractor 110, which can extract features from the HWE+BB 120 and can embed or encode the extracted features into embeddings 122. The feature extractor 110 may be, may include, or may have access to a second model 124 that can be or include a deep learning model. Additionally or alternatively, the feature extractor 110 may include an embeddings generator 126 that can convert features extracted by the second model 124 into the embeddings 122 that can be further processed by the signature identification system 102. In some embodiments, the second model 124, such as the deep learning model, can be trained using contrastive loss, which can teach the second model 124 discriminative features of different handwritten elements. The second model 124 can be pre-trained with synthetic, human-resembling font data in various languages and styles. The training features can be ensembled with stroke-based features, such as a TRACE model, which predicts stroke orders and stroke trajectory for the handwritten words. Upon extracting the set of features from the HWE+BB 120, the feature extractor 110 can use the embeddings generator 126 to convert the set of features into embeddings in which each embedding of the set of embeddings corresponds to a different handwritten element of the set of handwritten elements or to a different bounding box of the set of bounding boxes. The embeddings 122 can be provided to the clustering module 112.

The clustering module 112 may receive the embeddings 122 and may cluster the embeddings into a set of clusters 128. In some embodiments, each cluster of the set of clusters 128 may include at least one embedding of the embeddings 122. The clustering module 112 may use one or more techniques for clustering the embeddings 122 into the set of clusters 128. For example, the clustering module 112 may use k-means clustering or other suitable clustering techniques to group the embeddings 122 into the set of clusters 128. The one or more techniques may involve iterative refinement for optimizing the grouping of the embeddings 122 within the set of clusters 128. In some embodiments, each cluster of the set of clusters 128 may include one or more embeddings of the embeddings 122 that are more similar with respect to one another than to other embeddings of the embeddings 122. Additionally or alternatively, the set of clusters 128 may be unlabeled as output from the clustering module 112.

The layout analyzer 114 may receive the document image 104 and may analyze a layout or a structure of the document image 104. For example, the layout analyzer 114 may output layout information 130 relating to the document image 104. In some embodiments, the layout information 130 can be used to identify potential locations for signatures within the document image 104. The layout analyzer 114 can be fine-tuned to identify probability heatmaps for likely locations of signatures. In some embodiments, the probability heatmaps can be used to classify or label one or more clusters of the set of clusters 128 as a signature cluster or as a non-signature cluster. Additionally or alternatively, leveraging large vision models (LVMs) can enhance document context understanding for robust location identification for various use cases.

The set of clusters 128 and the layout information 130 can be provided to the cluster tagger and signature identifier 116 that can use at least the set of clusters 128 and the layout information 130 to generate information 132 identifying which handwritten elements are signatures and which handwritten elements are not signatures. In some embodiments, the set of clusters 128 and the layout information 130 can be combined to generate the information 132. In some examples, combining the set of clusters 128 and the layout information 130 may involve using the layout information 130 to tag each cluster of the set of clusters 128, which may further be tagged based on similarities between embeddings included in the set of clusters 128. The cluster tagger and signature identifier 116 may suppress false positive signatures and enhance accurate and/or precise identification of signatures. The information 132 may be provided to the downstream consumer system 106 that can use the information 132 to perform one or more operations. For example, the downstream consumer system 106 can use the information 132 to control, such as allow or deny, an interaction requested to be initiated using a document on which the document image 104 is based. Additionally or alternatively, the downstream consumer system 106 can use the information 132 to verify an identity of an entity associated with the document on which the document image 104 is based. The downstream consumer system 106 may use the information 132 to perform any additional or alternative operations.

Figure 2:
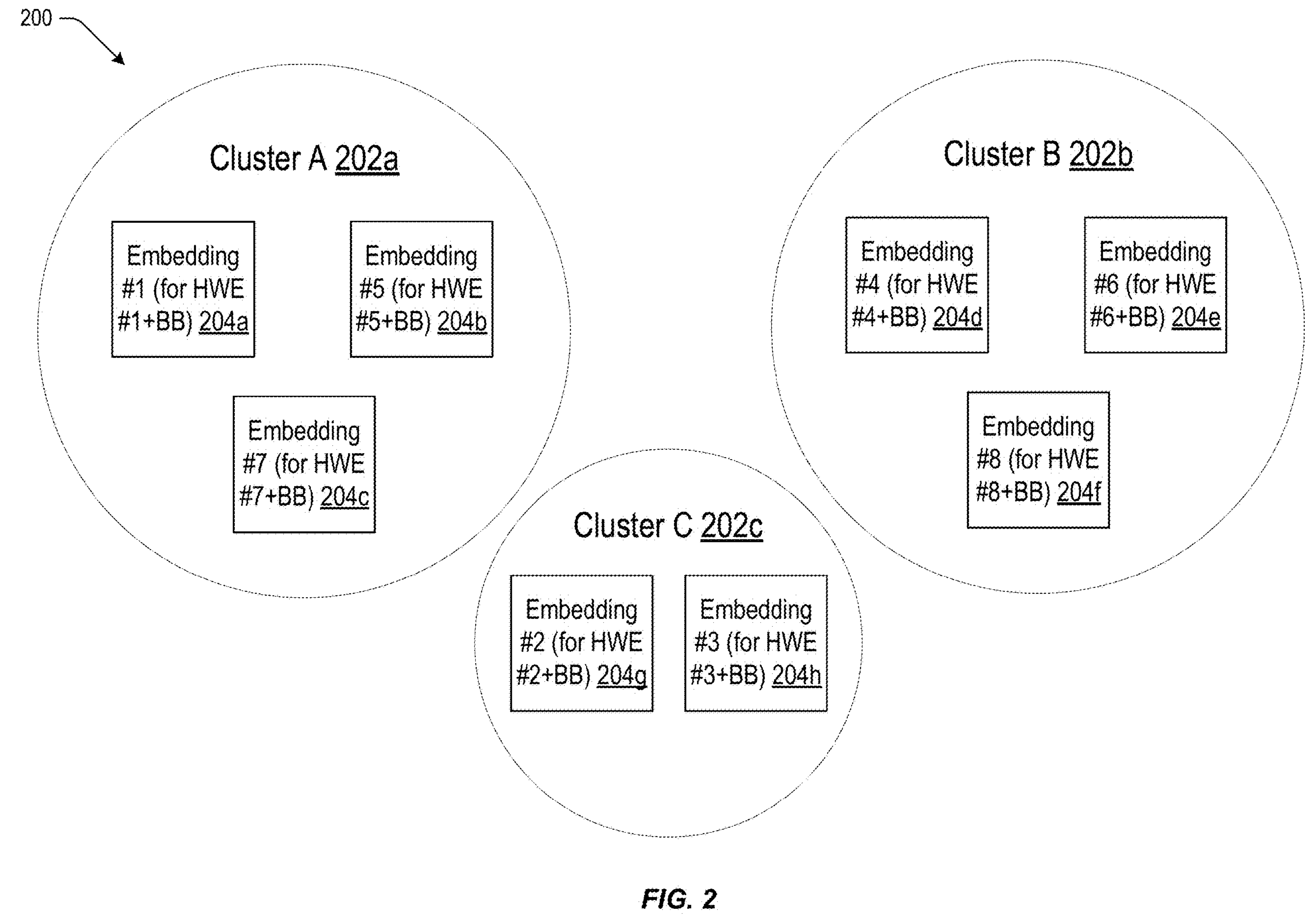
FIG. 2 is an example of a set of clusters for facilitating identification of signatures from handwritten elements in a document image according to at least one embodiment.

FIG. 2 is an example of a set of clusters 200 for facilitating identification of signatures from handwritten elements in a document image 104 according to at least one embodiment. The set of clusters 200 illustrated in FIG. 2 may be similar or identical to the set of clusters 128 illustrated and described with respect to FIG. 1. For example, the set of clusters 200 may be generated by the clustering module 112 of the signature identification system 102 and may be based on a set of handwritten elements detected from the document image 104. In other examples, the set of clusters 200 may be generated by a different system, using a different module or technique, or the like.

As illustrated in FIG. 2, the set of clusters 200 may include a first cluster 202*a*, a second cluster 202*b*, and a third cluster 202*c*. In some embodiments, the set of clusters 200 may include any other suitable number, such as more than three or less than three, of clusters. Additionally or alternatively, each cluster of the set of clusters 200 includes at least one embedding. An embedding may be a representation of a handwritten element included in the document image. As illustrated in FIG. 2, the first cluster 202*a* and the second cluster 202*b* each include three embeddings, and the third cluster 202*c* includes two embeddings. In other examples, each cluster may have a different number of embeddings, the same or similar number of embeddings, or the like. Embeddings included in a common cluster may have similarity scores between one another that exceed a threshold similarity score.

As illustrated in FIG. 2, the first cluster 202*a* includes a first embedding 204*a*, a fifth embedding 204*b*, and a seventh embedding 204*c*. Additionally or alternatively, the second cluster 202*b* includes a fourth embedding 204*d*, a sixth embedding 204*c*, and an eighth embedding 204*f*. Additionally or alternatively, the third cluster 202*c* includes a second embedding 204*g* and a third embedding 204*h*. The set of clusters may include any other suitable permutation for the embeddings. Each embedding illustrated in FIG. 2 may correspond to a different handwritten element of a document image. Additionally or alternatively, each embedding illustrated in FIG. 2 may correspond to a different bounding box that may be associated with the different handwritten element of the document image.

The first embedding 204*a* may be more similar to the fifth embedding 204*b* and the seventh embedding 204*c* than to the fourth embedding 204*d*, the sixth embedding 204*c*, the eighth embedding 204*f*, the second embedding 204*g*, and the third embedding 204*h*. For example, a first similarity score between the fifth embedding 204*b* and the first embedding 204*a* may be higher than a second similarity score between the fourth embedding 204*d* and the first embedding 204*a*, and so on. In some embodiments, the first similarity score may exceed the threshold similarity score. For example, and for similarity scores ranging from 0-100 in which 0 is completely dissimilar and in which 100 is identical, the first similarity score may exceed 90 or some other suitable threshold similarity score. Additionally or alternatively, the second similarity score may not exceed 90 or some other suitable threshold similarity score.

In some embodiments, the set of clusters 200 can be generated, for example by the clustering module 112, at least initially without labels. For example, each cluster of the set of clusters 128 can be generated and populated with the respective embeddings without identifying whether any of the embeddings is a signature and based upon similarities between the embeddings. The similarity scores between the embeddings, and layout information from the document image, can be used to apply labels to each cluster of the set of clusters and to otherwise identify signatures included in the document image.

Figure 3:
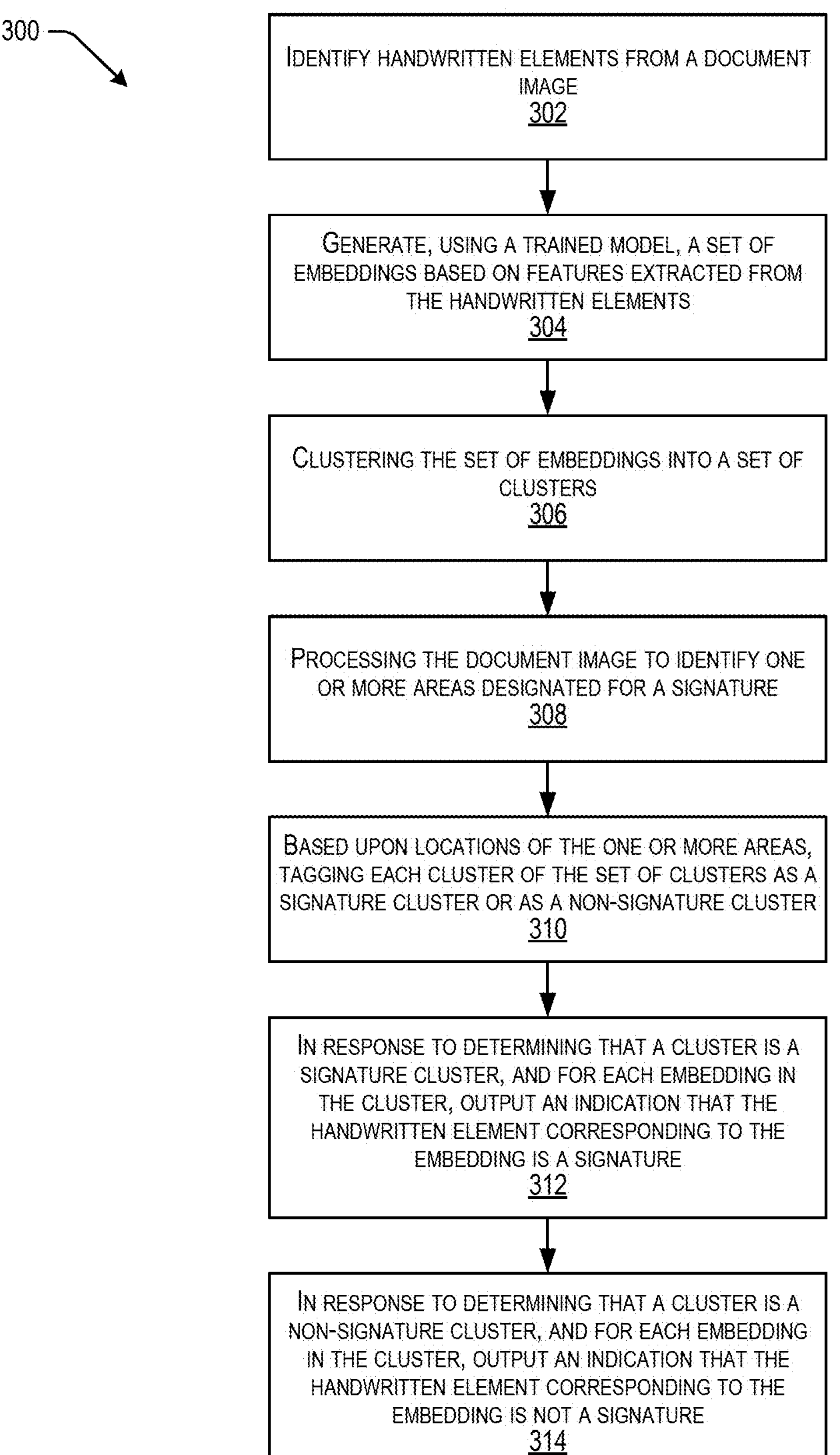
FIG. 3 is a flowchart of a process for detecting signatures from handwritten elements in a document image according to at least one embodiment.

FIG. 3 is a flowchart of a process 300 for identifying signatures from handwritten elements in a document image according to at least one embodiment. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed at least partially in parallel. It should be appreciated that in alternative embodiments, the processing depicted in FIG. 3 may include a greater number or a lesser number of steps than those depicted in FIG. 3. In certain embodiments, such as in the embodiment depicted in FIG. 1, the processing depicted in FIG. 3 may be performed by the signature identification system 102.

At 302, the process 300 involves identifying handwritten elements included in a document image. In some embodiments, the handwritten element detector 108 may identify the handwritten elements from the document image 104. The handwritten elements may be detected by the first model 118, which may be or include an object detection model. In some embodiments, the object detection model may be or include a real-time object detector that may be trained on synthetic data. The synthetic data may facilitate detecting each handwritten element, such as signatures and any other handwritten text, included in the document image. The object detection model may be trained on synthetic data and may not undergo training with training data received from a client or other source that does not include synthetic data. In some embodiments, the object detection model may assign probability scores to each handwritten element of the set of handwritten elements in one-to-one correspondence. An output of identifying the handwritten elements may include bounding boxes, which may correspond to the handwritten elements in which each bounding box of the bounding boxes corresponds to a different handwritten element of the handwritten elements.

At 304, the process 300 involves generating a set of embeddings based upon features extracted from the handwritten elements identified at 302. The features may be extracted from the handwritten elements using the second model 124, which may be or include a feature extraction model such as a deep learning model. The feature extraction model can be trained using a contrastive loss training technique. The contrastive loss training technique may involve training the feature extraction model with synthetic data that can be generated using a wide variety of handwriting-resembling fonts with variation in languages. The feature extraction model can use the principle of contrasting samples against each other to learn attributes or features that are common between data classes and attributes or features that set apart a data class from another. The contrastive loss training technique can allow the feature extraction model to learn generic features and nuanced features with respect to handwritten elements to allow for generalization for unknown writing styles. The extracted features from the handwritten elements can be converted into embeddings or otherwise encoded for future processing.

At 306, the process 300 involves clustering the set of embeddings into a set of clusters. The set of clusters may include one or more clusters, and each cluster of the one or more clusters can include at least one embedding of the set of embeddings. In some embodiments, the set of clusters may be generated by the clustering module 112, and the clustering module 112 may receive the set of embeddings and may cluster the embeddings into the set of clusters. The set of clusters may be clustered using one or more techniques for clustering the set of embeddings into the set of clusters. For example, the clustering module 112 may use k-means clustering or other suitable clustering techniques to group the set of embeddings into the set of clusters. The one or more techniques may involve iterative refinement for optimizing the grouping of the set of embeddings within the set of clusters. In some embodiments, each cluster of the set of clusters may include one or more embeddings of the set of embeddings that are more similar with respect to one another (e.g., have a similarity score exceeding a threshold similarity score) than to other embeddings of the set of embeddings. Additionally or alternatively, the set of clusters may be unlabeled as an output.

At 308, the process 300 involves processing the document image to identify one or more areas of the document image designated for placement of a signature. In some embodiments, an area may be designated for placement of a signature if the document image recites "Signature", if the document image includes a paragraph of text and then a blank line, or may otherwise suitably designate placement of a signature. The layout analyzer 114, which may be, may include, or may use a document image transformer (DiT), may process the document image to identify the one or more areas of the document image designated for placement of a signature. In some embodiments, the layout analyzer 114 may output layout information that can be used to identify potential locations for signatures within the document image. The layout analyzer can be fine-tuned to identify probability heatmaps for likely locations of signatures. In some embodiments, the probability heatmaps can be used to classify or label one or more clusters of the set of clusters as a signature cluster or as a non-signature cluster. Additionally or alternatively, leveraging large vision models (LVMs) can enhance document context understanding for robust location identification for various use cases.

At 310, the process 300 involves tagging each cluster of the set of clusters as a signature cluster or as a non-signature cluster. The set of clusters and the layout information may be provided to a module, such as the cluster tagger and signature identifier 116, which can use at least the set of clusters and the layout information to tag each cluster of the set of clusters. Tagging each cluster of the set of clusters may involve assigning a label of signature or of non-signature to each cluster of the set of clusters. In some embodiments, a particular handwritten element, or embedding associated therewith, may be tagged as a signature element based at least in part on a location indicated by the bounding box of the handwritten element. The location may overlap or otherwise be proximate to an area of the one or more areas designated for placement of a signature. Based on tagging the particular handwritten element, or embedding associated therewith, as a signature element, the corresponding cluster that includes the particular handwritten element can be tagged as a signature cluster. And, based on tagging the corresponding cluster as a signature cluster, each handwritten element corresponding to the embeddings included in the corresponding cluster may also be identified as signature elements.

At 312, the process 300 involves outputting an indication that one or more handwritten elements are signatures. In response to determining that a cluster is a signature cluster, and for each embedding in the cluster, an indication that the handwritten element corresponding to the embedding is a signature can be generated. The indication can include a note on a graphical user interface, can include providing the one or more handwritten elements to a separate system or service for further processing, and the like.

At 314, the process 300 involves outputting an indication that one or more handwritten elements are not signatures. In response to determining that a cluster is a non-signature cluster, and for each embedding in the cluster, an indication that the handwritten element corresponding to the embedding is not a signature can be generated. The indication can include a note on the graphical user interface, can include preventing the one or more handwritten elements from being further processed, and the like.

FIG. 4 is a flowchart of a process 400 for tagging clusters as signature clusters or as non-signature clusters according to at least one embodiment. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed at least partially in parallel. It should be appreciated that in alternative embodiments, the processing depicted in FIG. 4 may include a greater number or a lesser number of steps than those depicted in FIG. 4. In certain embodiments, such as in the embodiment depicted in FIG. 1, the processing depicted in FIG. 4 may be performed by the signature identification system 102.

At 402, the process 400 involves receiving a set of clusters and layout information for a document image. The set of clusters may be generated by the clustering module 112 based on a set of embeddings generated from features extracted from handwritten elements detected in the document image. The set of clusters may include one or more clusters, and each cluster of the set of clusters may include at least one embedding of the set of embeddings. Each embedding of the set of embeddings may include a bounding box defining a location of the corresponding handwritten element and including features that can be extracted from the handwritten element. The layout information may include one or more heatmaps generated by the layout analyzer 114. The one or more heatmaps may indicate one or more areas with high probabilities for designating placement of a signature.

At 404, the process 400 involves identifying one or more embeddings located in one or more areas that have a probability exceeding a threshold probability for being a signature location. The one or more areas may be indicated or otherwise identified by the layout information such as via the one or more heatmaps. The signature identification system 102 may, for each embedding of the set of embeddings, use the corresponding bounding box to determine a location of the corresponding handwritten element in the document image. The location of the corresponding handwritten element can be compared with locations of the one or more areas, and, based at least in part on the comparison, the one or more embeddings located in one or more areas that have a probability exceeding a threshold probability for being a signature location can be identified.

At 406, the process 400 involves tagging the one or more embeddings as corresponding to one or more signature elements. In some embodiments, the signature identification system 102 can identify a particular embedding as corresponding to a signature element if the particular embedding has an associated location that is located within, or within a predetermined distance from, the one or more areas that have a probability exceeding a threshold probability for being a signature location. Tagging the one or more embeddings as corresponding to one or more signature elements can involve, for a particular embeddings, associating the particular embedding with a signature tag or signature classification that can also be applied, such as via an output indication, to the corresponding handwritten element.

At 408, the process 400 involves tagging at least one cluster of the set of clusters as a signature cluster. In some embodiments, and for each cluster of one or more clusters of the set of clusters that includes at least one embedding of the one or more embeddings tagged as corresponding to a signature element, the cluster can be tagged as a signature cluster. Tagging the cluster as a signature cluster may involve applying a label to the cluster to classify the cluster as including embeddings that correspond to handwritten elements in the document image that are signatures. The at least one cluster may be tagged as a signature cluster if at least one embedding included in the at least one cluster is tagged as corresponding to a signature element.

At 410, the process 400 involves tagging the remaining embeddings in the cluster, which was tagged as a signature cluster, as corresponding to signature elements. In some embodiments, and for each cluster tagged as a signature cluster, each of the remaining embeddings may, regardless of their location indicated by the corresponding bounding box, be tagged or otherwise be indicated as corresponding to a signature element. In this way, the similarity between embeddings can be used to reduce false positive and false negative identifications of signatures. For example, signature elements that are located away from, or otherwise not within, the one or more areas designated for placement of a signature can be identified as signature elements. In some embodiments, and to strengthen the accuracy of the classification of the set of clusters, other document heuristics, such as cluster size, cluster intra-variance, detection confidence, and other statistical features, can be used. For instance, the cluster distance and the size of the cluster can provide strong clues to eliminate the outlier clusters such as a stray mark cluster. The embeddings within a signature cluster can be labelled as signatures regardless of its location within the document image to eliminate handwritten words from being mistakenly identified as potential signatures.

At 412, the process 400 involves using the tagged set of clusters and embeddings to output indications of signature elements or non-signature elements for handwritten elements of the document image. The tagged set of clusters and embeddings can be used to generate indications for each handwritten element included in the document image. The indications can include a note on a graphical user interface, instructions to use, or not to use, the handwritten elements in further processing, and the like. In some embodiments, the indications of signature elements or non-signature elements may be used to control an interaction, such as an account creation, a transfer of resources, or the like, between multiple entities or for other suitable purposes.

Figure 5:
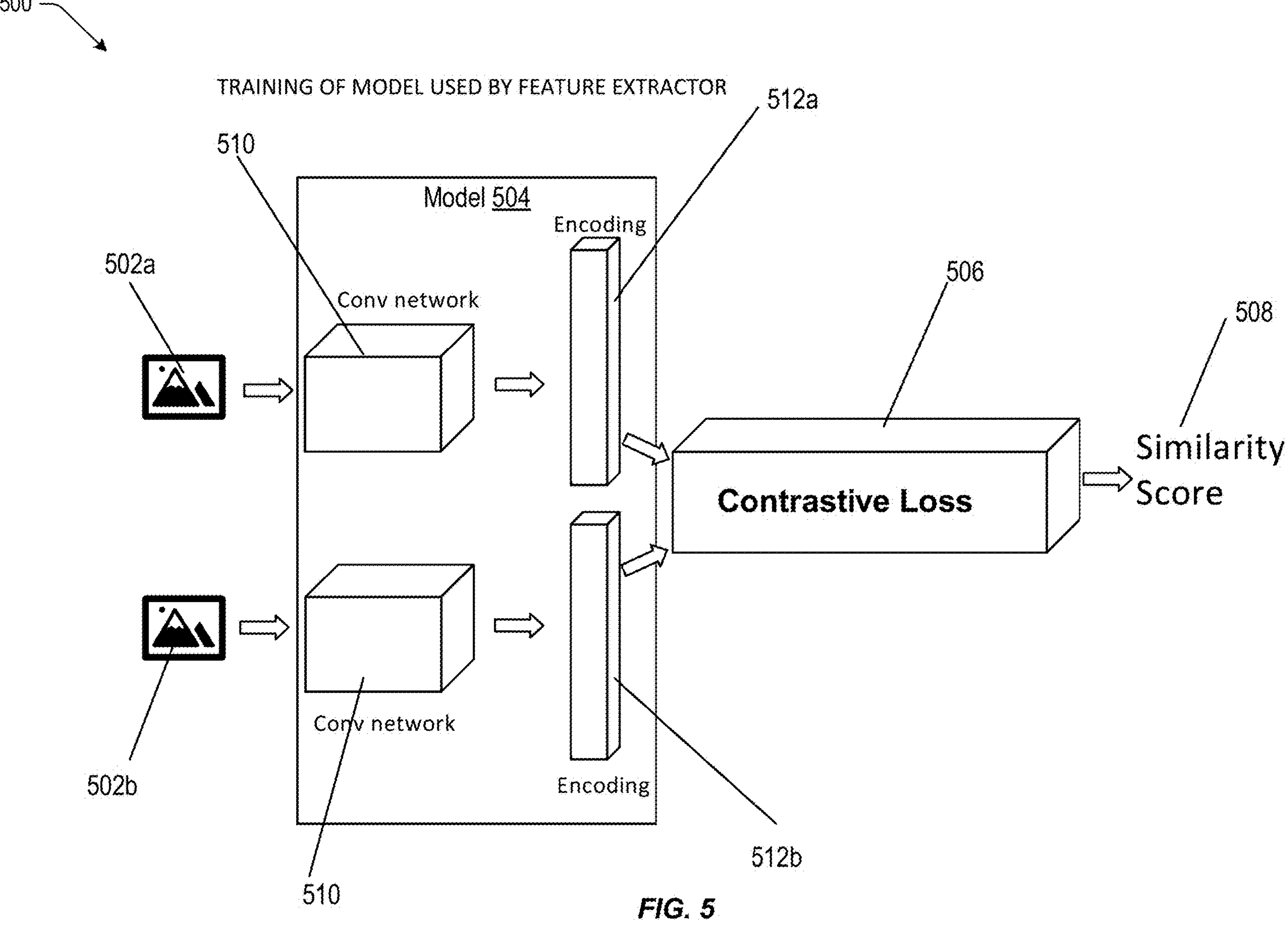
FIG. 5 is a data flow diagram of a contrastive loss training technique that can be used to train a feature extraction model to facilitate identifying signatures from handwritten elements according to at least one embodiment.

FIG. 5 is a data flow diagram 500 of a contrastive loss training technique that can be used to train a feature extraction model, such as a deep learning model or the second model 124, to facilitate identifying signatures from handwritten elements according to at least one embodiment. As illustrated in FIG. 5, the data flow diagram 500 can include a first input image 502*a*, a second input image 502*b*, a model 504, a contrastive loss module 506, and an output 508, though the data flow diagram 500 can include any additional, alternative, or fewer components for training the model 504. In some embodiments, the first input image 502*a* and the second input image 502*b* may be or include bounding boxes or other indicators of handwritten elements of a document image. For example, the first input image 502*a* may be a first bounding box corresponding to a first handwritten element, and the second input image 502*b* may be a second bounding box corresponding to a second handwritten element. The bounding boxes may define a location at which the corresponding handwritten element is located in the document image, and the bounding boxes may also have features that can be extracted and that can represent the corresponding handwritten elements.

The first input image 502*a* and the second input image 502*b* can be provided to the model 504, which may be or include a deep learning model or other suitable feature extraction model. The model 504 may include a convolutional neural network 510, and the first input image 502*a* and the second input image 502*b* can each be provided, such as separately, to the convolutional neural network 510. The convolutional neural network 510 may extract a first set of features from the first input image 502*a* and a second set of features from the second input image 502*b*. In some embodiments, the convolutional neural network 510 may include an encoder or other suitable module that can convert the extracted features to embeddings. For example, the convolutional neural network 510 can use a feature embedder to convert the first set of features to a first embedding 512*a* and to convert the second set of features to a second embedding 512*b*. The first embedding 512*a* may represent the features of the first handwritten element, and the second embedding 512*b* may represent the features of the second handwritten element. In some embodiments, the first embedding 512*a* may be generated by a first convolutional neural network, and the second embedding 512*b* may be generated by a second convolutional neural network that is a twin, which may have common weights and parameters, with respect to the first convolutional neural network.

The first embedding 512*a* and the second embedding 512*b* may be provided to the contrastive loss module 506 to determine a contrastive loss between the first embedding 512*a* and the second embedding 512*b*. The contrastive loss module 506 may generate a similarity score as the output 508, and the similarity score may be based upon the contrastive loss between the first embedding 512*a* and the second embedding 512*b*. In other examples, the output 508 may be or include a contrastive loss value or score that can be used to update one or more weights of a feature extraction model. Contrastive loss training may encourage the model 504 to minimize distance, or maximize a similarity score, between similar pairs and maximize distance, or minimize the similarity score, between dissimilar pairs.

In some embodiments, a degree of similarity, such as the similarity score, between the first input image 502*a* and the second input image 502*b* is known. The first input image 502*a* and the second input image 502*b* may be included in a training dataset that includes synthetic data and that has similarity scores precalculated for each pair of training data points included in the training dataset. For example, a first similarity score between the first input image 502*a* and the second input image 502*b* may be N, which may be the ground truth. The model 504 may be trained using contrastive loss using the first input image 502*a* and the second input image 502*b*, and the model 504 can cause a second similarity score to be determined between the first input image 502*a* and the second input image 502*b*. For the contrastive loss training, a contrastive loss value or score can be compared with N, and, if the second similarity score is within a predefined threshold distance from N, or if the contrastive loss is within an expected range, the model 504 may be considered trained and may proceed to inference stage. In examples in which the second similarity score is not within the predefined threshold distance from N or if the contrastive loss in not within the expected range, the weights and/or parameters for the model 504 may be adjusted, and the training process may be iteratively performed.

Figure 6:
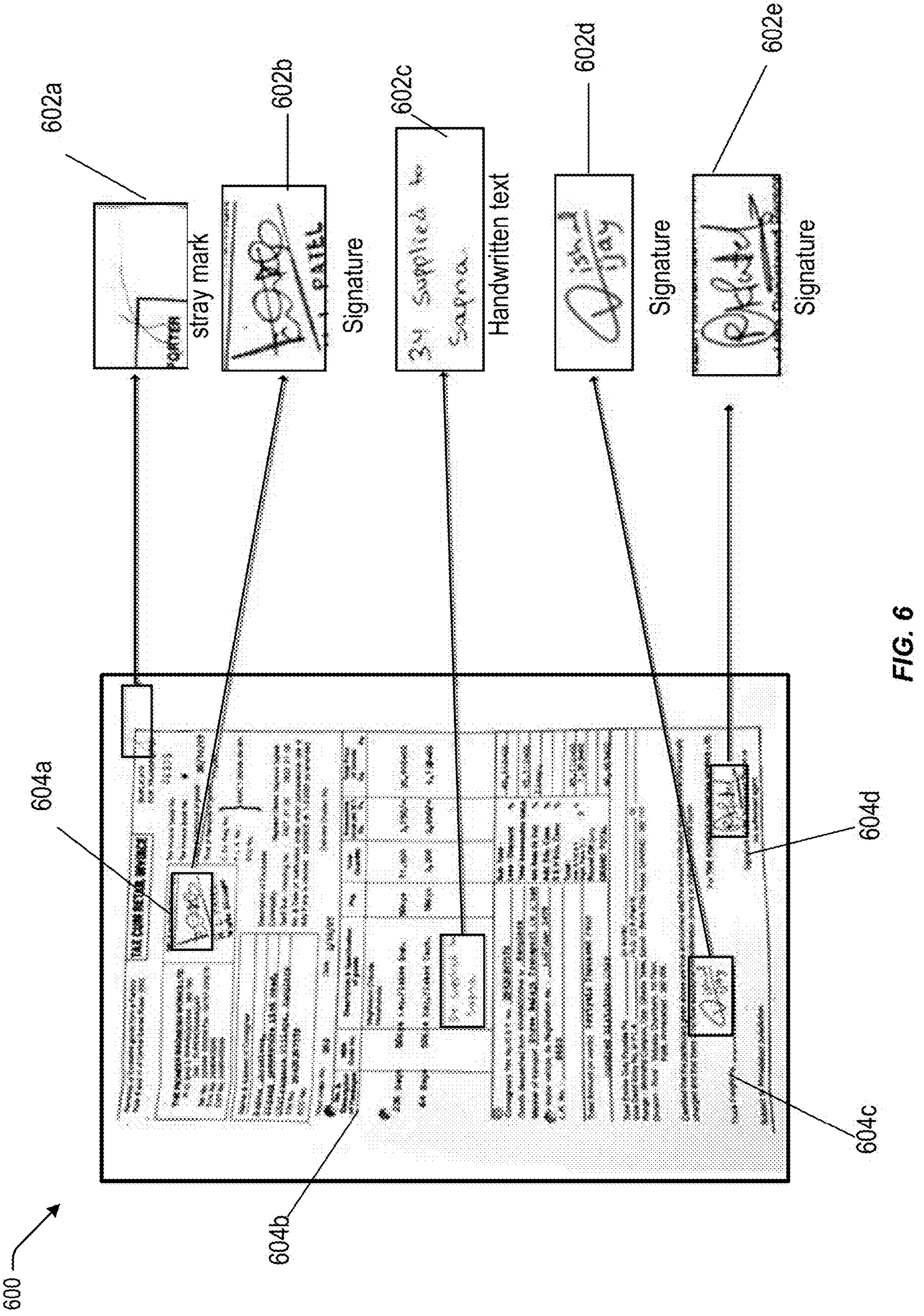
FIG. 6 is an example of a document image that can be analyzed by one or more trained models to identify signatures from handwritten elements according to at least one embodiment.

FIG. 6 is an example of a document image 104 that can be analyzed by one or more trained models to identify signatures from handwritten elements according to at least one embodiment. The document image 104 may be a digitized version of a paper-based document or may be a digitized version of a different source document. The document image 104 may include content and handwritten elements. For example, such as the example illustrated in FIG. 6, the document image 104 includes a set of handwritten elements and a set of other content. The set of handwritten elements can include handwritten elements such as a first handwritten element 602*a*, a second handwritten element 602*b*, a third handwritten element 602*c*, a fourth handwritten element 602*d*, and a fifth handwritten element 602*e*, though the document image 104 may include additional, alternative, or fewer handwritten elements. Additionally or alternatively, the set of other content can include non-handwritten elements such as a first non-handwritten element 604*a*, a second non-handwritten element 604*b*, a third non-handwritten element 604*c*, and a fourth non-handwritten element 604*d*, though the document image 104 may include additional, alternative, or fewer non-handwritten elements.

The signature identification system 102 may identify the first handwritten element 602*a* as a non-signature element, such as a stray mark, may identify the second handwritten element 602*b* as a signature element, may identify the third handwritten element 602*c* as a non-signature element, such as handwritten text, may identify the fourth handwritten element 602*d* as a signature element, and may identify the fifth handwritten element 602*e* as a signature element. The signature identification system 102 may use a combination of (i) locations, such as location indicated by corresponding bounding boxes, associated with the handwritten elements and (ii) similarity scores between the handwritten elements to make the foregoing identifications. For example, the signature identification system 102 may use similarity scores between the handwritten elements to cluster the handwritten elements into a set of clusters. Additionally or alternatively, the signature identification system 102 can use the location of the fourth handwritten element 602*d* and the location of the fifth handwritten element 602*e* to tag the respective handwritten elements, and the corresponding cluster or clusters, as signature elements or signature clusters. The signature identification system 102 can then use the similarity score between the second handwritten element 602*b* and the fourth handwritten element 602*d* or the fifth handwritten element 602*e* to also tag the second handwritten element 602*b* as a signature element even though the second handwritten element 602*b* may located within the second non-handwritten element 604*b*, which may be a table of content.

In certain embodiments, the signature identification functionality described in this disclosure may be offered via a cloud service provided by a cloud service provider (CSP). For example, a CSP may offer a fault injection cloud service that can be subscribed to by one or more customers. For a customer subscribing to such a service, users associated with the subscribing customer can then use the cloud service to identify signatures in a document image. FIGS. 7-10 and the accompanying description provided below describe various examples of cloud architectures that may be used to implement such a cloud service.

Examples of Architectures for Implementing Cloud Infrastructures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an OaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 5," may be located in Region 1 and in "Region 2." If a call to Deployment 5 is made by the service gateway 836 contained in the control plane VCN 816 located in Region 1, the call may be transmitted to Deployment 5 in Region 1. In this example, the control plane VCN 816, or Deployment 5 in Region 1, may not be communicatively coupled to, or otherwise in communication with, Deployment 5 in Region 2.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example of a Computer System or Device

FIG. 11 illustrates an example computer system 1100, in which various embodiments may be implemented. The system 1100 may be used to implement any of the computer systems and processing systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some, or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:

identifying a set of handwritten elements from a document image;

generating, using a trained model, a set of embeddings for the set of handwritten elements by generating an embedding for each handwritten element in the set of handwritten elements, wherein an embedding generated for a handwritten element represents one or more features extracted from the handwritten element;

clustering the set of embeddings to create a set of clusters, each cluster included in the set of clusters comprising at least one embedding from the set of embeddings;

embedding from the set of embeddings; processing the document image to identify one or more areas within the document image designated for placement of a signature;

signature; based upon locations of the one or more areas within the document image, tagging each cluster included in the set of clusters as a signature cluster or as a non-signature cluster;

for each cluster included in the set of clusters that is tagged as a signature cluster, and for each embedding included in the signature cluster, outputting an indication that a handwritten element of the set of handwritten elements corresponding to the embedding is a signature element; and for each cluster included in the set of clusters that is tagged as a non-signature cluster, and for each embedding included in the non-signature cluster, outputting an indication that a handwritten element of the set of handwritten elements corresponding to the embedding is a non-signature element.

2. The computer-implemented method of claim 1, wherein the trained model is a trained feature extraction model that is configured to extract the one or more features from each handwritten element included in the set of handwritten elements, and wherein the feature extraction model is trained using a contrastive loss technique.

3. The computer-implemented method of claim 2, wherein using the contrastive loss technique comprises:

receiving a first handwritten element and a second handwritten element, wherein the first handwritten element and the second handwritten element are included in a synthetic training dataset;

extracting, using the feature extraction model, one or more first features from the first handwritten element and one or more second features from the second handwritten element;

generating (i) a first embedding based on the one or more first features and (ii) a second embedding based on the one or more second features;

determining a contrastive loss between the first embedding and the second embedding;

and determining, based at least in part on the contrastive loss between the first embedding and the second embedding, whether to update one or more weights of the feature extraction model.

4. The computer-implemented method of claim 3, further comprising, in accordance with determining that the one or more weights are to be updated, updating the one or more weights of the feature extraction model based at least in part on the contrastive loss.

5. The computer-implemented method of claim 1, wherein tagging each cluster included in the set of clusters as a signature cluster or as a non-signature cluster comprises, for each handwritten element included in the set of handwritten elements:

identifying, based on a bounding box associated with the handwritten element, a location of the handwritten element within the document image;

determining whether the handwritten element is within an area designated for a signature by comparing the location to the one or more areas; and in accordance with determining that the handwritten element is within the area, tagging a particular cluster that includes the handwritten element as a signature cluster.

6. The computer-implemented method of claim 5, wherein the particular cluster comprises a second handwritten element, and wherein the computer-implemented method further comprises:

determining, based on a second bounding box associated with the second handwritten element, that the second handwritten element is not located within the area designated for a signature; and outputting, based on the second handwritten element being included in the particular cluster, an indication that the second handwritten element is a signature element.

7. The computer-implemented method of claim 1, wherein processing the document image to identify the one or more areas within the document image designated for placement of a signature comprises using a document image transformer module to perform the processing, and wherein the document image transformer module is pre-trained on synthetic data and contextual data relating to the document image.

8. A system comprising:

one or more processors; and a memory coupled to the one or more processors, the memory storing a plurality of instructions executable by the one or more processors, the plurality of instructions comprising instructions executable by the one or more processors to cause the system to perform operations comprising:

identifying a set of handwritten elements from a document image;

generating, using a trained model, a set of embeddings for the set of handwritten elements by generating an embedding for each handwritten element in the set of handwritten elements, wherein an embedding generated for a handwritten element represents one or more features extracted from the handwritten element;

clustering the set of embeddings to create a set of clusters, each cluster included in the set of clusters comprising at least one embedding from the set of embeddings;

processing the document image to identify one or more areas within the document image designated for placement of a signature;

based upon locations of the one or more areas within the document image, tagging each cluster included in the set of clusters as a signature cluster or as a non-signature cluster;

for each cluster included in the set of clusters that is tagged as a signature cluster, and for each embedding included in the signature cluster, outputting an indication that a handwritten element of the set of handwritten elements corresponding to the embedding is a signature element; and for each cluster included in the set of clusters that is tagged as a non-signature cluster, and for each embedding included in the non-signature cluster, outputting an indication that a handwritten element of the set of handwritten elements corresponding to the embedding is a non-signature element.

9. The system of claim 8, wherein the trained model is a trained feature extraction model that is configured to extract the one or more features from each handwritten element included in the set of handwritten elements, and wherein the feature extraction model is trainable using a contrastive loss technique.

10. The system of claim 9, wherein the operation of using the contrastive loss technique comprises:

receiving a first handwritten element and a second handwritten element, wherein the first handwritten element and the second handwritten element are included in a synthetic training dataset;

extracting, using the feature extraction model, one or more first features from the first handwritten element and one or more second features from the second handwritten element;

generating (i) a first embedding based on the one or more first features and (ii) a second embedding based on the one or more second features;

determining a contrastive loss between the first embedding and the second embedding;

and determining, based at least in part on the contrastive loss between the first embedding and the second embedding, whether to update one or more weights of the feature extraction model.

11. The system of claim 10, wherein the operations further comprise, in accordance with determining that the one or more weights are to be updated, updating the one or more weights of the feature extraction model based at least in part on the contrastive loss.

12. The system of claim 8, wherein the operation of tagging each cluster included in the set of clusters as a signature cluster or as a non-signature cluster comprises, for each handwritten element included in the set of handwritten elements:

identifying, based on a bounding box associated with the handwritten element, a location of the handwritten element within the document image;

determining whether the handwritten element is within an area designated for a signature by comparing the location to the one or more areas; and in accordance with determining that the handwritten element is within the area, tagging a particular cluster that includes the handwritten element as a signature cluster.

13. The system of claim 12, wherein the particular cluster comprises a second handwritten element, and wherein the operations further comprise:

determining, based on a second bounding box associated with the second handwritten element, that the second handwritten element is not located within the area designated for a signature; and outputting, based on the second handwritten element being included in the particular cluster, an indication that the second handwritten element is a signature element.

14. The system of claim 8, wherein the operation of processing the document image to identify the one or more areas within the document image designated for placement of a signature comprises using a document image transformer module to perform the processing, and wherein the document image transformer module is pre-trained on synthetic data and contextual data relating to the document image.

15. A non-transitory computer-readable memory storing a plurality of instructions executable by one or more processors, the plurality of instructions comprising instructions that, when executed by the one or more processors, cause performance of operations comprising:

identifying a set of handwritten elements from a document image;

generating, using a trained model, a set of embeddings for the set of handwritten elements by generating an embedding for each handwritten element in the set of handwritten elements, wherein an embedding generated for a handwritten element represents one or more features extracted from the handwritten element;

clustering the set of embeddings to create a set of clusters, each cluster included in the set of clusters comprising at least one embedding from the set of embeddings;

processing the document image to identify one or more areas within the document image designated for placement of a signature;

based upon locations of the one or more areas within the document image, tagging each cluster included in the set of clusters as a signature cluster or as a non-signature cluster;

for each cluster included in the set of clusters that is tagged as a signature cluster, and for each embedding included in the signature cluster, outputting an indication that a handwritten element of the set of handwritten elements corresponding to the embedding is a signature element; and for each cluster included in the set of clusters that is tagged as a non-signature cluster, and for each embedding included in the non-signature cluster, outputting an indication that a handwritten element of the set of handwritten elements corresponding to the embedding is a non-signature element.

16. The non-transitory computer-readable memory of claim 15, wherein the trained model is a trained feature extraction model that is configured to extract the one or more features from each handwritten element included in the set of handwritten elements, and wherein the feature extraction model is trainable using a contrastive loss technique.

17. The non-transitory computer-readable memory of claim 16, wherein the operation of using the contrastive loss technique comprises:

receiving a first handwritten element and a second handwritten element, wherein the first handwritten element and the second handwritten element are included in a synthetic training dataset;

extracting, using the feature extraction model, one or more first features from the first handwritten element and one or more second features from the second handwritten element;

generating (i) a first embedding based on the one or more first features and (ii) a second embedding based on the one or more second features; determining a contrastive loss between the first embedding and the second embedding;

and determining, based at least in part on the contrastive loss between the first embedding and the second embedding, whether to update one or more weights of the feature extraction model.

18. The non-transitory computer-readable memory of claim 15, wherein tagging each cluster included in the set of clusters as a signature cluster or as a non-signature cluster comprises, for each handwritten element included in the set of handwritten elements:

identifying, based on a bounding box associated with the handwritten element, a location of the handwritten element within the document image;

determining whether the handwritten element is within an area designated for a signature by comparing the location to the one or more areas; and in accordance with determining that the handwritten element is within the area, tagging a particular cluster that includes the handwritten element as a signature cluster.

19. The non-transitory computer-readable memory of claim 18, wherein the particular cluster comprises a second handwritten element, and wherein the operations further comprise:

determining, based on a second bounding box associated with the second handwritten element, that the second handwritten element is not located within the area designated for a signature; and outputting, based on the second handwritten element being included in the particular cluster, an indication that the second handwritten element is a signature element.

20. The non-transitory computer-readable memory of claim 15, wherein the operation of processing the document image to identify the one or more areas within the document image designated for placement of a signature comprises using a document image transformer module to perform the processing, and wherein the document image transformer module is pre-trained on synthetic data and contextual data relating to the document image.

* * * * *